US007099689B2

(12) United States Patent
Bahl et al.

(10) Patent No.: US 7,099,689 B2
(45) Date of Patent: Aug. 29, 2006

(54) ENERGY-AWARE COMMUNICATIONS FOR A MULTI-RADIO SYSTEM

(75) Inventors: Paramvir Bahl, Issaquah, WA (US); Atul Adya, Redmond, WA (US); Alastair Wolman, Seattle, WA (US); Jitendra D. Padhye, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 543 days.

(21) Appl. No.: 10/610,293

(22) Filed: Jun. 30, 2003

(65) Prior Publication Data

US 2004/0266493 A1    Dec. 30, 2004

(51) Int. Cl.
*H04Q 7/20* (2006.01)
(52) U.S. Cl. .................. 455/552.1; 455/522; 455/572; 455/574; 370/338; 370/345; 370/466; 370/400
(58) Field of Classification Search ............... 455/11.1, 455/38.1, 33.4, 542, 572, 573, 574, 343.1, 455/346.6, 125.5; 370/338, 345, 466, 400
See application file for complete search history.

(56) References Cited

U.S. PATENT DOCUMENTS

| | | | |
|---|---|---|---|
| 6,653,816 B1 * | 11/2003 | Peek et al. .................. 320/132 |
| 6,654,378 B1 * | 11/2003 | Mahany et al. .............. 370/401 |
| 6,931,555 B1 * | 8/2005 | Osborn ....................... 713/320 |
| 6,975,667 B1 * | 12/2005 | Mattisson et al. .......... 375/132 |
| 2002/0183092 A1 * | 12/2002 | Suzuki et al. ............... 455/557 |
| 2003/0119568 A1 * | 6/2003 | Menard ....................... 455/572 |
| 2004/0066300 A1 * | 4/2004 | Dorenbosch ............. 340/636.1 |

* cited by examiner

*Primary Examiner*—Erika A. Gary
*Assistant Examiner*—Julio Perez
(74) *Attorney, Agent, or Firm*—Lee & Hayes, PLLC

(57) ABSTRACT

Described herein is an implementation that reduces the battery consumption of an energy-constrained computing device that is capable of communicating over a wireless network. As conditions and circumstances warrant, the implementation selects one of multiple radios (e.g., two)—with each having a unique combination of characteristics (in terms of power-consumption, data-rate, range and/or frequency band of operation) for wireless communications to and from a wireless device. The implementation selects one radio to minimize power-consumption while maintaining effective wireless data communication. This abstract itself is not intended to limit the scope of this patent. The scope of the present invention is pointed out in the appending claims.

19 Claims, 4 Drawing Sheets

ENERGY-AWARE COMMUNICATIONS FOR A MULTI-RADIO SYSTEM

TECHNICAL FIELD

This invention generally relates to a wireless communications technology.

BACKGROUND

Wireless computing devices, such as laptop computers, personal digital assistant devices, etc., which communicate with other devices through wireless signals, are becoming increasingly popular. Wireless computing devices are typically mobile and battery-powered. Since the battery capacity is limited, minimizing the energy consumption of a device in order to extend its operation time is an important consideration in the design of battery-operated wireless devices.

A particular component of a wireless device that consumes a significant amount of energy is the network interface card (NIC), which handles the wireless transmission and reception of network communication data. It has been estimated that, on average, about twenty percent of the total energy available to a wireless device is dissipated as a result of using the NIC, or other wireless network interfacing component.

This phenomenon is due to the fact that the NIC of the wireless device must be in a constant "listening" state in order to receive data via the network. As a result, the battery is used to power the device and the NIC even when no data is being received by or transmitted by the device. The NIC also consumes energy while transmitting and receiving messages. However, in typical use, it expends a significant amount of energy in idle mode while waiting for messages.

To improve the battery lifetime of conventional wireless devices, various schemes have been developed and implemented to reduce battery consumption.

One power management scheme often employed by wireless devices entails switching the NIC between different power states that have different energy consumption levels. Those states include a high-power state, in which the NIC is powered up to enable the transmission of network communication data, and a low-power state, in which the network interface card is put in a sleep mode.

When the NIC is in a low-power state, data transmissions can be significantly delayed while the NIC switches to the high-power state and attempts to reconnect to the network. Consequently, the delayed data has to be buffered until the NIC is ready for data communication. A significant amount of delayed network traffic data must be buffered if the interface network card is kept in the low-power state too often or for too long.

SUMMARY

An implementation is described herein that reduces the battery consumption of an energy-constrained computing device that is capable of communicating over a wireless network. As conditions and circumstances warrant, an implementation, described herein, selects one of multiple radios (e.g., two)—with each having a unique combination of characteristics (in terms of power-consumption, data-rate, range and/or frequency band of operation) for wireless communications to and from a wireless device. An implementation, described herein, selects one radio to minimize power-consumption while maintaining effective wireless data communication.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

Figure 1:
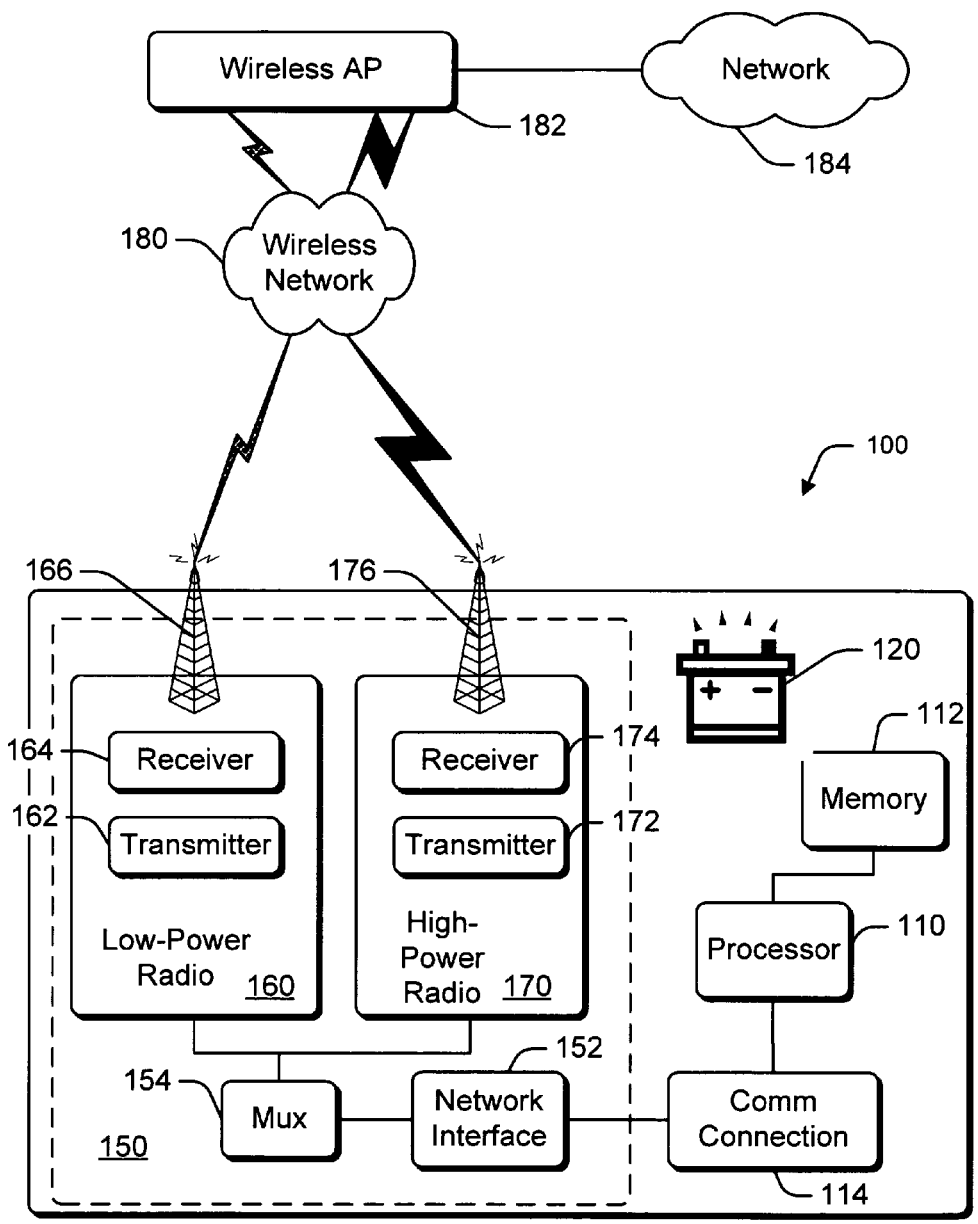
FIG. 1 is a block diagram of a system and a suitable environment, in accordance with an implementation described herein.

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of the present invention, and thereby, to better explain the present invention. Furthermore, for ease of understanding, certain method steps are delineated as separate steps; however, these separately delineated steps should not be construed as necessarily order dependent in their performance.

The following description sets forth one or more exemplary implementations of Energy-Aware Communications for a Multi-Radio System that incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the claimed present invention; rather, the inventors have contemplated that the claimed present invention might also be embodied and implemented in other ways, in conjunction with other present or future technologies.

An example of an embodiment of Energy-Aware Communications for a Multi-Radio System may be referred to as an "exemplary multi-radio communicator."

Introduction

The exemplary multi-radio communicator, described herein, reduces the battery consumption of an energy-constrained computing device that is capable of communicating over a wireless network. The exemplary multi-radio communicator selects one of multiple radios (e.g., two)—with each having a unique combination of characteristics (in terms of power-consumption, data-rate, range and/or frequency band of operation) for wireless communications to and from a wireless device. Its selection of a particular radio is done in response to the current conditions so that a proper balance is maintained between energy consumption and wireless network communications bandwidth, which in turn affects user perceived latency.

An example of a networked environment in which embodiments of the invention may be used is described with reference to FIGS. 1 and 4. The one or more exemplary implementations, described herein, of the present claimed invention may be implemented (in whole or in part) by a dual-radio communications system 150 and/or as part of a computing environment like that shown in FIG. 4.

Wireless computing devices suitable for the exemplary multi-radio communicator include, but are not limited to, personal data assistants, cellular phones, and laptop computers with wireless network interface capabilities. Herein, wireless communication includes the use of radio frequency electromagnetic waves rather than wires to transmit data between computing devices.

To facilitate wireless communication, a computing device may be equipped with a network interface card (NIC) that interfaces the device to the network. Typically, the NIC is implemented as a plug and play component that can be inserted into a network interface (e.g., card slot) of the computing device. Alternatively, the NIC can be built integrally as part of the circuitry of the wireless computing device.

To facilitate wireless communication, the NIC supports a wireless protocol, such as pursuant to the IEEE 802.11 standard. General reference will be made herein to 802.11 and 802.15 as suitable protocols for facilitating wireless communication between devices. However, those skilled in the art will recognize that these are only examples of suitable protocols for facilitating wireless communication and that the invention is not limited to any one or two wireless protocols. Indeed, other wireless protocols may be utilized alternatively or additionally in connection with the invention. It will also be recognized by those skilled in the art that 802.11 refers to a set of protocols within the same family (e.g., 802.11a, 802.11b, and 802.1 g)

Dual-Radio Communications System

FIG. 1 shows a wireless mobile computing device 100 with the dual-radio communications system 150. In its most basic configuration, the mobile device 100 typically includes at least one processing unit 110 and a memory 112.

The wireless mobile computing device 100 typically has a portable power source 120, such as a battery pack, fuel cell, or other power module. The power source 120 acts as a primary source of power for computations and wireless data transmissions performed by the device 100.

When the device 100 is described herein as "powered up," the device power source 120 is used to render the device in an "ON" state of operation. Conversely, when the device is described as being "powered down," the device is in an "OFF" state of operation, with little or no power being drawn by any component.

The device 100 also contains one or more communications connections 114 that allow the device to communicate with other devices. The communications connections 114 may be an internal or external communications bus. A communications connection is an example of a communication medium.

The communications connections 114 may be connected to the dual-radio communications system 150. The system may reside on a separate component or may be integrally included on the motherboard of the device or even possibly built into the processor.

The system has a wireless network interface connection 152. Through the wireless network interface connection (NIC) 152, the wireless device 100 may communicate to an infrastructure network 180 through a wireless access point (AP) 182 thereof. The AP, in turn, may connect the device to one or more other networks 184, such as the Internet.

Alternatively, the wireless device 100 may also be part of a peer-to-peer network, also referred to as an ad hoc network, that includes other wireless devices.

The dual-radio communications system 150 has at least two wireless communication units for wireless network communications: radio 160 and radio 170. These wireless communication units may also be simply called radios. The dual-radio communications system 150 may also have a multiplexer 154 for switching between the two radios. The multiplexer 154 may be implemented in hardware, software, or a combination of both.

Each radio has a transmitter 162, 172, each of which is coupled to its own antenna 166, 176, for transmitting data wirelessly over a suitable frequency channel. Each radio also has a receiver 164, 174, which is also coupled to one of the antennas, for receiving communication packets wirelessly transmitted from the networks that the device is communicating with. Since each radio has a transmitter and receiver, it may also be called a "transceiver."

One radio 160 is a low-power radio (LPR) and the other radio 170 is a high-power radio (HPR). The LPR 160 provides a low data-rate while consuming a low amount of energy. The HPR 170 provides a high data-rate while consuming a high amount of energy.

The dual-radio communications system 150 utilizes the HPR 170 when there are high bandwidth requirements. However, when the bandwidth requirements are low, the dual-radio communications system 150 switches from the HPR 170 to the LPR 160 to send and receive data. The HPR can then be powered off. In doing so, the exemplary multi-radio communicator minimizes the negative impact on user-perceived latency while still reducing energy consumption.

In general, the exemplary multi-radio communicator may be implemented on any device that has more than one radio. The dual-radio communications system 150 may have a single network interface card that has at least two radios built into it—a high data rate radio (such as the popular IEEE 802.11 {a,b,g} wireless LAN radio) and a low data-rate radio (such as Bluetooth and the newly standardized IEEE 802.15 radio).

The two radios may operate over different frequency bands, use different modulation schemes, and use different channel access strategies. However, it is desirable for the power characteristics of the two radios to be different (perhaps even vastly different).

The exemplary multi-radio communicator is described in the context of two radios. One is a low-power radio and the other is a high-power radio. However, those skilled in the art will recognize that other embodiments of the invention are not limited to only two radios. Indeed, other embodiments may utilize three or more radios. Each radio may have a unique combination of power-consumption, data-rate, range and/or frequency band of operation. These alternative embodiments may select from amongst these multiple radios to match the present communication needs of the system to the radio having the desired combination.

The exemplary multi-radio communicator profiles applications, wireless links, and network congestion in real-time. Using this information, it adaptively selects the appropriate radio for communications.

In FIG. 1, the dual-radio communications system 150 is shown with a single network interface 152 having multiple radios. Alternatively, the system may have multiple network interfaces and each network interface may have a single radio. For example, a system may have one network interface with a LPR and another with a HPR.

Low-Power Radio (LPR)

The LPR 160 is comprised of various components for receiving and sending of data, including a logic device for controlling the operation of the transceiver. The primary power source 120 is typically the power source for the LPR.

The LPR 160 also includes a radio frequency (RF) generator (e.g., transmitter 162) for emitting and generating radio frequency signals. Other elements for implementing or enhancing the transceiver functions may also be included as part of the low power transceiver circuitry.

Physically, the LPR 160 can be implemented as an internal component of the device 100, such as by integrating it with the primary motherboard of the device, or it can be connected to the computing device via a peripheral communications connection (e.g., input channels). Exemplary operating characteristics for the LPR 160 are shown in Table 1.

TABLE 1

Example operational characteristics for the low power transceiver 100.

| Data Rate | 19.2 Kbps |
| --- | --- |
| Modulation | On-Off Keying (OOK) |
| Voltage | 3 V |
| Receiver Current | 4.5 mA |
| Peak Radio Output Power | 0.75 mW |

As shown in Table 1, the various characteristics of the LPR 160 result in low energy consumption. Preferably, the LPR operates in a low frequency band such as the 900 MHz band. This is because radio waves propagate better at lower frequencies than at higher frequencies and the loss of range due to low energy operation is compensated for by better propagation. To contrast LPR characteristics with HPR characteristics, standard wireless NICs such as those that implement IEEE 802.11 {b,g}, which we characterize as HPRs, operate in the higher 2.4 GHz frequency band.

Conventional NICs, such as those based on the IEEE 802.11 standard, operate at much higher data rates, which range from 1–54 Mbps. Higher data rates are achieved by complex electronic circuitry, which require greater current to operate. Consequently, standard NICs require a bigger battery for proper operation.

The LPR 160, however, requires less power to operate, and may be configured to remain active even during powered off states for the wireless device 100. While not limited to the operating characteristics of TABLE 1, the LPR is suitable for generating and receiving RF signals without requiring significant energy usage by the device.

Program Modules of the Exemplary Dual-Radio Communications System

The dual-radio communications system 150 may have two main program-module components: a dual-radio service ("DR Service"), which may be a user-level service or daemon), and a dual-radio driver ("DR Driver"), which may be a kernel-level NDIS intermediate driver. These program-module components are typically part of an operating system and/or are layered on top of an operating system. However, one or both of these program-module components may be implemented in ROM, RAM, or firmware of the dual-radio communications system 150. The two modules may also be implemented in an integrated fashion.

The DR Service may perform some or all of the methodological logic to determine whether to switch from one radio to another and to direct such switching.

The DR Driver is an NDIS intermediate driver that sits under the networking layer but above the data-link layer. The job of this driver is to expose the two radios 160 and 170 as a single wireless network interface to the upper layer protocols and applications. An application binds to a single network address but the communication may use either radio.

When transmitting, the DR Service instructs the DR Driver to use a particular radio to transmit the next set of data packets. When receiving, the DR Driver receives data packets on one of its two radios and sends the packets up to the next protocol layer. The DR Driver exposes a single interface (e.g., an IEEE 802.3 interface) to the higher layer protocols and applications. When the DR Service selects the low-power radio, the DR Service also instructs the operating system to turn off the high-power radio, thus reducing energy consumption of the wireless device.

The exemplary multi-radio communicator is agnostic of both the underlying hardware and the networking protocols. Consequently, the device may use any radios in the system, and the application can use any networking protocols in the system.

Methodological Implementations of the Exemplary Multi-Radio Communications

Figure 2:
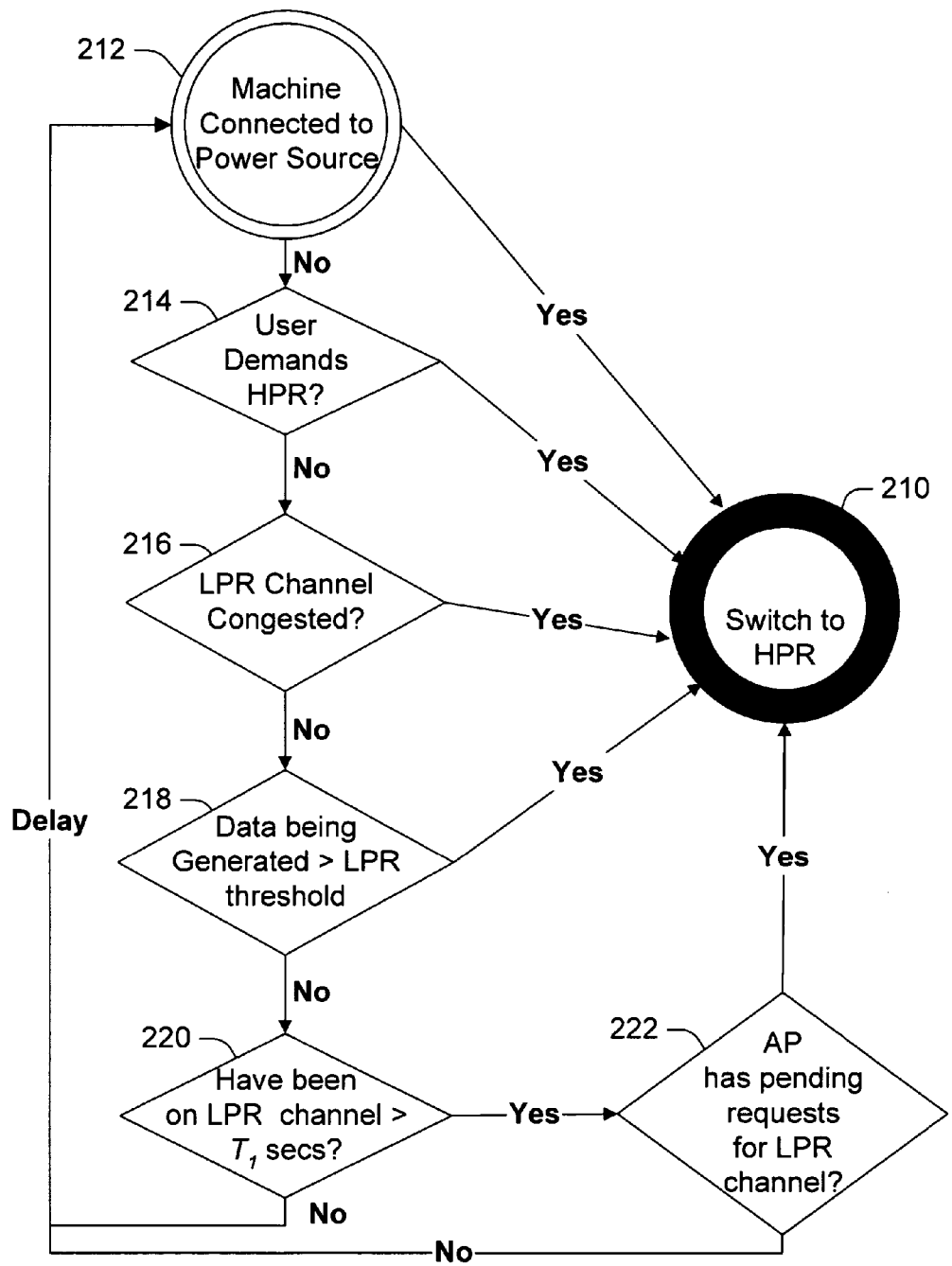
FIG. 2 is a flow diagram showing a methodological implementation described herein.
Figure 3:
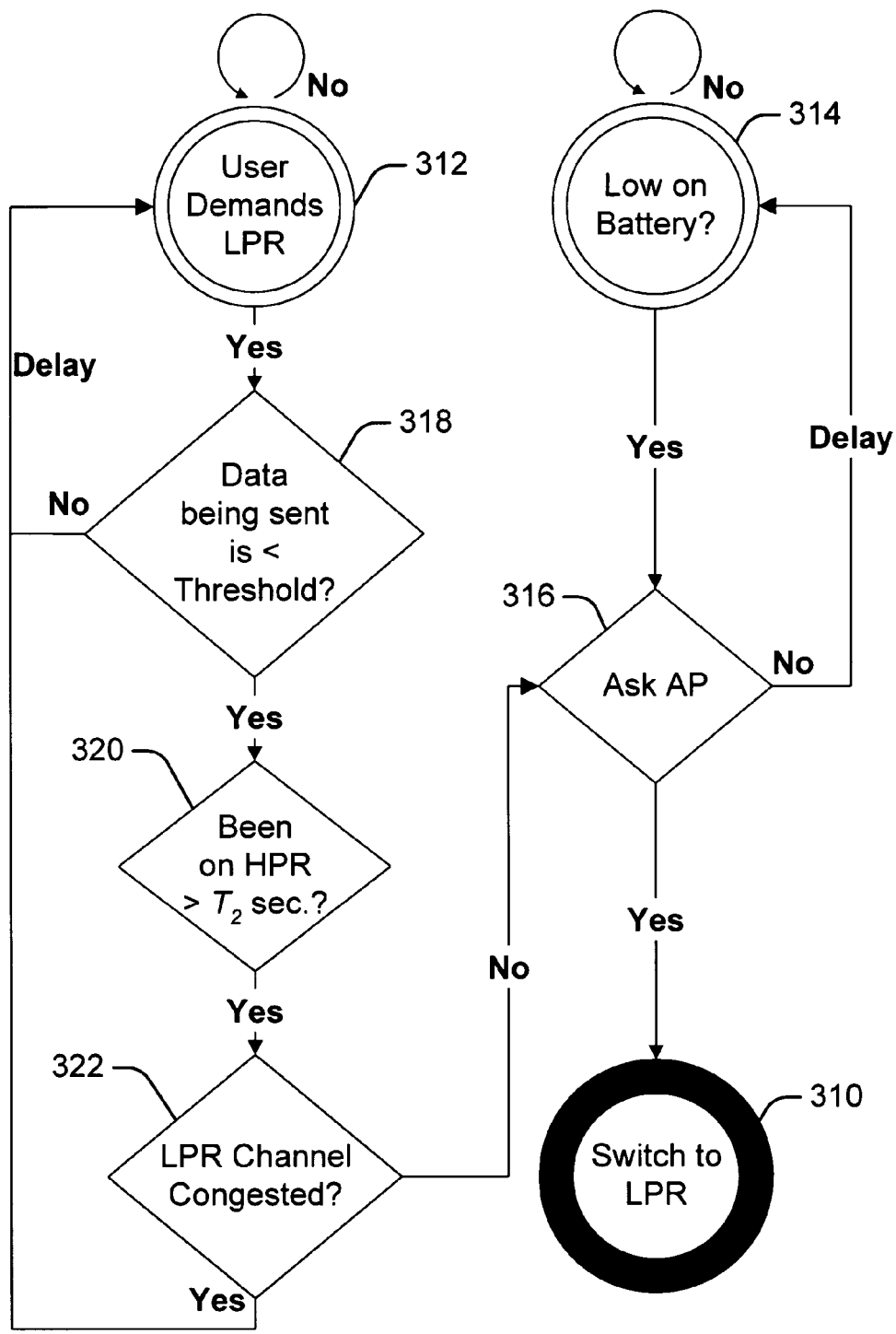
FIG. 3 is a flow diagram showing a methodological implementation described herein.

FIGS. 2 and 3 show methodological implementations of the exemplary multi-radio communicator performed by the dual-radio communications system 150 (or some portion thereof). The methodological implementation shown in FIG. 2 performs operations directed towards switching to the HPR. The methodological implementation shown in FIG. 3 performs operations directed towards switching to the LPR. These methodological implementations may be performed in software, hardware, or a combination thereof.

Of course, the ordering of the steps shown in FIGS. 2 and 3 are only provided for illustration. Other implementations may employ other orderings of the steps.

Switching to the HPR

FIG. 2 illustrates the methodological steps and conditions that the DR Service uses to determine whether to instruct the DR Driver to switch from the LPR to the HPR for transmission of data packets. The decision to switch from the LPR to the HPR is represented by circle 210 in FIG. 2.

Block 212 of FIG. 2 represents the start state of the methodological steps of FIG. 2. So, the process returns to here when it cycles back through.

At 212, the exemplary multi-radio communicator determines if the mobile device 100 is connected to an unlimited power source (e.g., an A/C electrical outlet). If so, limiting energy consumption is not an important consideration. If so, then it switches to the HPR at 210. If not, then it proceeds to the next block.

At 214 of FIG. 2, the exemplary multi-radio communicator determines if the user indicates that he or she wishes to use the HPR. Perhaps, because of concerns about latency or a lack of concern about power-consumption, the user may demand that the HPR be used. If so, then it switches to HPR at 210. If not, then it proceeds to the next block.

At 216 of FIG. 2, the exemplary multi-radio communicator determines if the LPR channel is congested and that packets are taking an unreasonable amount of time to get through. What is unreasonable can be a system defined value, an empirically determined value, a value specified by a user, or a value specified by an application. If the LPR channel is congested, then it switches to HPR at 210. If not, then it proceeds to the next block.

The exemplary multi-radio communicator detects congestion through the use of probe packets. The frequency of probes can vary (e.g., a frequency of one probe every 500 ms.). The round trip time (RTT) for these probes is measured. Congestion determination is based upon how high or low this RTT measurement is. The decision may be refined based on information about the channel from the AP 182. Since the AP handles all traffic, it knows how much traffic it is handling on the LPR channel. This information can be combined with the probe RTT to give an improved measure of congestion in the wireless link.

At 218 of FIG. 2, the exemplary multi-radio communicator determines if the rate of data being generated is greater than the maximum threshold set for the LPR. If so, then it switches to HPR at 210. If not, then it proceeds to the next block. The DR device driver counts the number of incoming (Lo, and outgoing bytes to determine the recent data rates.

At 220 of FIG. 2, the exemplary multi-radio communicator ensures fair use of the LRP channel by the device. This may be loosely defined as the ability of energy-constrained devices vying for the LPR channel to use the channel for an amount of time that is comparable to other devices wanting to use the same channel. The idea is to ensure that no device takes over the LPR channel completely. Instead, every device that is trying to save battery power can do so by using its LPR.

One way to do this is to specify that each device may use the LPR channel for a segment of time, with a maximum value of $T_1$ seconds (e.g., 5 seconds). If the device has had the channel for greater than $T_1$ seconds, then it proceeds to the next block. If not, then it cycles back through the conditions. At 222 of FIG. 2, the exemplary multi-radio communicator determines if the AP has pending requests for the LPR channel from other wireless devices on the wireless network. If so, then it switches to HPR at 210. If not, then it cycles back through the conditions. Even after the device has been on the LPR channel for over a specified period of time $T_1$, it may stay on the LPR if the AP does not have any pending requests for the LPR channel from other devices. This represents the situation where the target device is the only one wanting to use the LPR channel or when staying on this channel does not effect the operation of other devices on the network. In this situation, the "channel lease" for the device is extended by a fixed amount. At the end of the lease, if the device wants to stay on the LPR channel it may check again with the AP.

Switching to LPR

FIG. 3 illustrates the methodological steps and conditions that the DR Service uses to determine whether to instruct the DR Driver to switch an on-going transmission from HPR to LPR for transmission of data packets. The decision to switch from HPR to LPR is represented by circle 310 in FIG. 3.

Unlike the methodological implementation of FIG. 2, there are two start-states for the methodological implementation described in FIG. 3: blocks 312 and 314. The first one at 312 is if the user explicitly asks that the device use the LPR, possibly because he or she wants to preserve the battery and increase the device lifetime. The second start-state at 314 is if the device is running low on batteries. It is possible for both of these start-state conditions (312 and 314) to be true simultaneously.

If the device is running low on battery, the exemplary multi-radio communicator at 316 of FIG. 3 may request the AP for permission to use the LPR channel. The AP may grant the permission depending on the state of the channel and the reason for the request, which cannot be a malicious use of the LPR channel. If the AP grants the request, then it switches to LPR. Otherwise, it returns to the original low-battery state at 314.

At 312, the user explicitly requests that the device use the LPR channel.

In that case, the exemplary multi-radio communicator at 318 of FIG. 3 determines if the data generation rate for the device is below some threshold. If so, then it proceeds to the next block. Otherwise, it returns to the original user request start-state at 312.

The threshold for the data generation rate is a function of the data rate supported by the LPR. The idea is that if the demand exceeds the supply then it is better for the device to stay on the HPR channel.

Next, at 320, the exemplary multi-radio communicator checks if the device has been on the HPR channel for at least a certain amount of time $T_2$. If so, then it proceeds to the next block. Otherwise, it returns to the original user request start-state at 312. This condition helps avoid thrashing behavior where the device is constantly switching between LPR and HPR channels.

Finally, at 322, the exemplary multi-radio communicator determines if the LPR channel is congested. It may do this through the mechanisms described above: the RTT probe mechanism and the mechanism of asking the AP. If the channel is not congested and the AP allows the device to use the LPR channel, the exemplary multi-radio communicator switches to the LPR channel and all packets are transmitted through the LPR. If it is congested, it returns to the original user request start-state at 312.

In switching from the LPR channel to the HPR channel, the final decision is with the AP (represented by the asking the AP at 316).

Switching Protocol

Before switching to a different radio (as is performed at 210 and 310 of FIGS. 2 and 3, respectively), the exemplary multi-radio communicator informs the AP that it is going to perform the switch. This procedure is called the "switching protocol." The mobile device initiates the switching protocol and informs the AP about its decision. Alternatively, the AP may implement its own policies and unilaterally ask a mobile device to switch the device's current radio.

While the protocol is being executed, both radios are kept on by the device so that no packets are dropped. Furthermore, while the switching protocol is being executed, no other switches are initiated.

When a Radio May be Switched Off

This section describes some implementation details of at least one alternative embodiment.

The switching protocol helps determine whether there are any packets on a specific radio that remain to be sent. If not, then that the specific radio may be switched off without loss of packets. In a typical switching protocol, when the device sends a request to the AP to switch from radio X to radio Y, it waits for the AP's acknowledgment (ACK) before switching off radio X. To avoid packet loss, the DR Driver on the mobile device must check if there are any packets waiting for transmission on X before it can switch off radio X.

With the exemplary multi-radio communicator, the DR Driver does not have any mechanism to directly keep track of the number of packets currently stored in the buffers of radio X. This is because the firmware of many wireless cards typically buffers packets and replies to the operating system before those packets have been transmitted. Thus, by switching off the radio, there is a possibility that some packets in the firmware buffers can be lost.

To address this buffering problem, the exemplary multi-radio communicator may alternatively use a marker packet to flush out the packet queue on radio X. In this scheme, when a switch has to be performed, the DR Service on the mobile device informs the DR Driver not to send any further data packets on radio X. It then sends a special marker packet to the AP's DR Service on radio X. When the AP ACKs this packet, the device's DR Service knows that no packets are buffered in the firmware and switches off the radio.

Pessimistic vs. Optimistic Switching

The switching protocol is usually either optimistic (i.e., switch immediately after informing AP) or pessimistic (i.e., wait for AP to say that it is okay to switch) about switching to the other radio.

When using the pessimistic switching approach, the mobile device may use any radio to inform the AP that it is switching, but it does not switch until it gets an acknowledgment (ACK) from the AP on that channel. If the AP ACKs the request, the DR Service switches the radio from X to Y and uses the marker packet mechanism to determine when radio X can be switched off. Note that the AP continues to send data on radio X until it has sent an ACK to the switch-radio request. The AP knows that both radios X and Y of the mobile device must be on at that point. This mobile device switches radio X off when it receives the ACK message from the AP.

When using the optimistic switching approach, the mobile device sends its switch request on the currently selected channel. For example, if it is switching from radio X to Y, the request is sent on X. The message sent by the device acts as a switch request and as a marker packet. At this point, the device optimistically switches to radio Y, and it switches off X when the ACK is received from the AP. If the AP denies the request to switch, the device switches back to radio X, and it informs the AP on the new channel (e.g., radio Y) that it is switching back to its original channel (e.g., radio X).

The advantage of the optimistic approach is that it switches from radio X to Y with only one message being sent to the AP. In contrast, the pessimistic protocol takes two (2) messages. If the local congestion estimate of the mobile device (e.g., based on the probes) is reasonable, then one would expect the AP to rarely deny the switch requests. Thus, in this scenario, the optimistic approach would perform well.

However, if the local congestion estimates are unreasonable, a switch from the HRP to the LPR channel could increase the usage of the LPR channel unnecessarily. For example, the device would have to switch back immediately when the AP denies the request. The advantage of the pessimistic approach is that the AP controls the behavior of all the mobile devices (with respect to channel usage). Since it has a complete view of the traffic, it might be able to make better decisions. Thus, even if the local information on the mobile device is inaccurate, the pessimistic protocol can ensure that the mobile station does not switch back and forth unnecessarily.

As mentioned earlier, the AP may unilaterally ask a mobile device to switch from radio X to radio Y. In this case, both approaches behave in a similar manner. The mobile device sends a marker packet and switches immediately (the pessimistic approach does not have to obtain permission since the AP has already given it). The AP starts sending data on the radio Y only when it receives the marker packet (because at that point the AP knows that both radio X and Y must be powered up at the mobile device).

Exemplary Computing System and Environment

Figure 4:
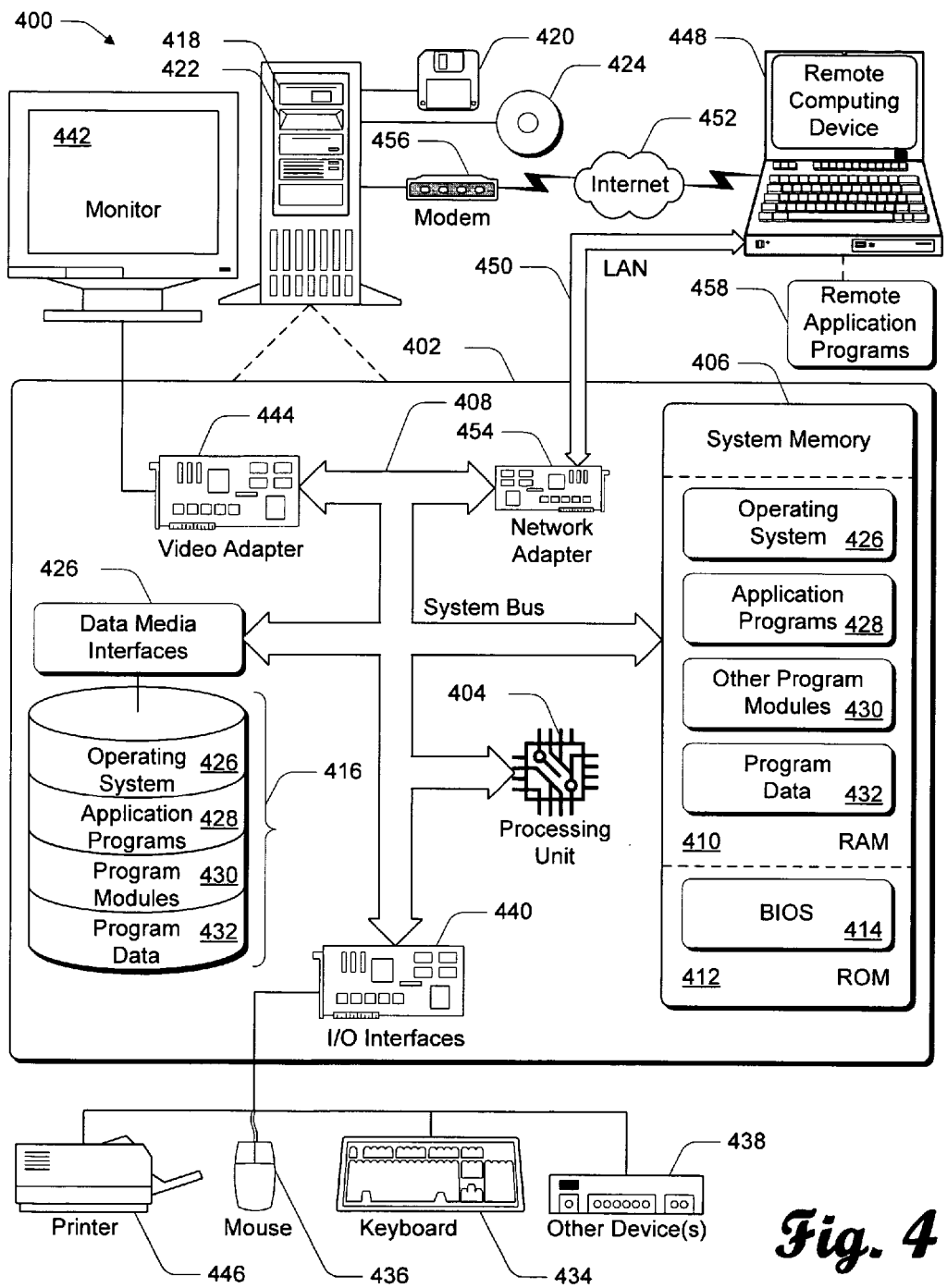
FIG. 4 is an example of a computing operating environment capable of (wholly or partially) implementing at least one embodiment described herein.

FIG. 4 illustrates an example of a suitable computing environment 400 within which an exemplary multi-radio communicator, as described herein, may be implemented (either fully or partially). The computing environment 400 may be utilized in the computer and network architectures described herein.

The exemplary computing environment 400 is only one example of a computing environment and is not intended to suggest any limitation as to the scope of use or functionality of the computer and network architectures. Neither should the computing environment 400 be interpreted as having any dependency or requirement relating to any one or combination of components illustrated in the exemplary computing environment 400.

The exemplary multi-radio communicator may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary multi-radio communicator may be described in the general context of computer-executable instructions, such as program modules, being executed by a computer. Generally, program modules include routines, programs, objects, components, data structures, etc. that perform particular tasks or implement particular abstract data types. The exemplary multi-radio communicator may also be practiced in distributed computing environments where tasks are performed by remote processing devices that are linked through a communications network. In a distributed computing environment, program modules may be located in both local and remote computer storage media including memory storage devices.

The computing environment 400 includes a general-purpose computing device in the form of a computer 402. The components of computer 402 may include, but are not limited to, one or more processors or processing units 404, a system memory 406, and a system bus 408 that couples various system components, including the processor 404, to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer-readable media. Such media may be any available media that is accessible by computer 402 and includes both volatile and non-volatile media, removable and non-removable media.

The system memory 406 includes computer-readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 may be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer-readable media, which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 416, magnetic disk 420, optical disk 424, ROM 412, and/or RAM 410, including by way of example, an operating system 426, one or more application programs 428, other program modules 430, and program data 432.

A user may enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device may also be connected to the system bus 408 via an interface, such as a video adapter 444. In addition to the monitor 442, other output peripheral devices may include components, such as speakers (not shown) and a printer 446, which may be connected to computer 402 via the input/output interfaces 440.

Computer 402 may operate in a networked environment using logical connections to one or more remote computers, such as a remote computing device 448. By way of example, the remote computing device 448 may be a personal computer, portable computer, a server, a router, a network computer, a peer device or other common network node, and the like. The remote computing device 448 is illustrated as a portable computer that may include many or all of the elements and features described herein, relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet. Such networking environments may be wired or wireless.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which may be internal or external to computer 402, may be connected to the system bus 408 via the input/output interfaces 440 or other appropriate mechanisms. It is to be appreciated that the illustrated network connections are exemplary and that other means of establishing communication link(s) between the computers 402 and 448 may be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components, such as the operating system, are illustrated herein as discrete blocks, although it is recognized that such programs and components reside at various times in different storage components of the computing device 402, and are executed by the data processor(s) of the computer.

Computer-Executable Instructions

An implementation of an exemplary multi-radio communicator may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 4 illustrates an example of a suitable operating environment 400 in which an exemplary multi-radio communicator may be implemented. Specifically, the exemplary multi-radio communicator(s) described herein may be implemented (wholly or in part) by any program modules 428–430 and/or operating system 426 in FIG. 4 or a portion thereof.

The operating environment is only an example of a suitable operating environment and is not intended to suggest any limitation as to the scope or use of functionality of the exemplary multi-radio communicator(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer-Readable Media

An implementation of an exemplary multi-radio communicator may be stored on or transmitted across some form of computer-readable media. Computer-readable media may be any available media that may be accessed by a computer. By way of example, computer-readable media may comprise, but is not limited to, "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer-readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, communication media may comprise, but is not limited to, wired media such as a wired network or direct-wired connection, and wireless media such as acoustic, RF, infrared, and other wireless media. Combinations of any of the above are also included within the scope of computer-readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computer-readable medium having a program module with computer-executable instructions that, when executed by an energy-constrained computing device having at least two radios—a low-power radio (LPR) and a high-power radio (HPR)—for wireless data communications over a wireless network, perform a method comprising:
    obtaining a power-status indication of the remaining power still available from a power resource of the energy-constrained computing device, the power resource having a limited maximum power capacity;
    determining whether the power-status indication indicates that the remaining power still available from the power resource of the energy-constrained computing device is relatively low;
    responsive to the power-status indication determination, switching active communication from the HPR to the LPR when the power-status indication indicates that the remaining power is relatively low;
    obtaining a permissive indication from a wireless access point (AP) on the wireless network;
    determining whether the permissive indication indicates that the AP permits the energy-constrained computing device on the wireless network to utilize a LPR channel of the LPR;
    responsive to the permissive indication determination, switching active communication from the HPR to the LPR when the permissive-indication indicates that the AP permits the energy-constrained computing device on the wireless network to utilize the LPR channel of the LPR.

2. A medium as recited in claim 1, wherein a "relatively low" status indication indicates that the remaining power is twenty-five percent or less of the limited maximum power capacity of the power resource.

3. An energy-constrained computing device comprising:
    a low-power radio (LPR) configured to wirelessly communicate data at a low-data rate over a wireless network;
    a high-power radio (HPR) configured to wirelessly communicate data at a high-data rate over the wireless network, wherein power consumption during communication via the HPR is significantly more than the power consumption during communication via the LPR;
    a medium as recited in claim 1.

4. A computer-readable medium having a program module with computer-executable instructions that, when executed by an energy-constrained computing device having at least two radios—a low-power radio (LPR) and a high-power radio (HPR)—for wireless data communications over a wireless network, performs a method comprising:
    obtaining a rate indication that indicates a rate at which the energy-constrained computing device is generating data for communication over the wireless network;
    determining whether the rate indication indicates that the data-generation rate is at or below a defined threshold;
    responsive to the data-generation rate determination, switching active communication from the HPR to the LPR when the indicated rate is at or below the defined threshold;
    obtaining a channel-congestion indication that indicates a congestion level of a LPR channel employed by the LPR;
    based upon the channel-congestion indication, determining the congestion level of the LPR channel employed by the LPR;
    responsive to the channel-congestion indication determination, switching active communication from the HPR to the LPR when the channel-congestion indication indicates that the LPR channel employed by the LPR is not congested.

5. An energy-constrained computing device comprising:
    a low-power radio (LPR) configured to wirelessly communicate data at a low-data rate over a wireless network;
    a high-power radio (HPR) configured to wirelessly communicate data at a high-data rate over the wireless network, wherein power consumption during communication via the HPR is significantly more than power consumption during communication via the LPR;
    a medium as recited in claim 4.

6. A computer-readable medium having a program module with computer-executable instructions that, when executed by an energy-constrained computing device having at least two radios—a low-power radio (LPR) and a high-power radio (HPR)—for wireless data communications over a wireless network, performs a method comprising:

obtaining a permissive indication from a wireless access point (AP) on the wireless network;

determining whether the permissive indication indicates that the wireless AP permits the energy-constrained computing device on the wireless network to utilize a LPR channel of the LPR;

responsive to the permissive indication determination, switching active communication from the HPR to the LPR when the permissive indication indicates that the wireless AP permits the energy-constrained computing device on the wireless network to utilize a LPR channel of the LPR;

obtaining a HPR-timer indication which indicates how long the HPR has been active;

based upon the HPR-timer indication, determining whether the HPR has been active more than a defined activity threshold;

responsive to the HPR-timer indication determination, switching active communication from the HPR to the LPR when the HPR has been active more than the defined activity threshold.

7. An energy-constrained computing device comprising:

a low-power radio (LPR) configured to wirelessly communicate data at a low-data rate over a wireless network;

a high-power radio (HPR) configured to wirelessly communicate data at a high-data rate over the wireless network, wherein power consumption during communication via the HPR is significantly more than the power consumption during communication via the LPR;

a medium as recited in claim 6.

8. A computer-readable medium having a program module with computer-executable instructions that, when executed by an energy-constrained computing device having at least two radios—a low-power radio (LPR) and a high-power radio (HPR)—for wireless data communications over a wireless network, perform a method comprising obtaining a channel-congestion indication that indicates a congestion level of a LPR channel employed by the LPR; based upon the channel-congestion indication, determining the congestion level of the LPR channel employed by the LPR;

responsive to the channel-congestion determination, switching active communication from the HPR to the LPR when the channel-congestion indication indicates that the LPR channel employed by the LPR is not congested;

obtaining a user-demand indication that indicates whether a user demands that the LPR be activated;

based upon the user-demand indication, determining whether the user demands that the LPR be activated;

responsive to the user-demand determination, switching active communication from the HPR to the LPR when the user demands that the LPR be activated.

9. An energy-constrained computing device comprising:

a low-power radio (LPR) configured to wirelessly communicate data at a low-data rate over a wireless network;

a high-power radio (HPR) configured to wirelessly communicate data at a high-data rate over the wireless network, wherein power consumption during communication via the HPR is significantly more than the power consumption during communication via the LPR;

a medium as recited in claim 8.

10. A computer-readable medium having a program module with computer-executable instructions that, when executed by an energy-constrained computing device having at least two radios—a low-power radio (LPR) and a high-power radio (HPR)—for wireless data communications over a wireless network, performs a method comprising:

obtaining channel-congestion indication that indicates a congestion level of a LPR channel employed by the LPR;

based upon the channel-congestion indication, determining the congestion level of the LPR channel employed by the LPR;

responsive to the channel-congestion indication determination, switching active communication from the LPR to the HPR when the channel-congestion indication indicates that the LPR channel employed by the LPR is not congested;

obtaining a power-status indication of the remaining power still available from a power resource of the energy-constrained computing device;

determining whether the power-status indication indicates that the energy-constrained computing device is receiving energy from an external power source;

responsive to the power-status indication determination, switching active communication from the LPR to the HPR when the power-status indication indicates that the energy-constrained computing device is receiving energy from the external power source.

11. An energy-constrained computing device comprising:

a low-power radio (LPR) configured to wirelessly communicate data at a low-data rate over a wireless network;

a high-power radio (HPR) configured to wirelessly communicate data at a high-data rate over the wireless network, wherein power consumption during communication via the HPR is significantly more than the power consumption during communication via the LPR;

a medium as recited in claim 10.

12. A computer-readable medium having a program module with computer-executable instructions that, when executed by an energy-constrained computing device having at least two radios—low-power radio (LPR) and a high-power radio (HPR)—for wireless data communications over a wireless network, perform a method comprising:

obtaining a rate indication that indicates a rate at which the energy-constrained computing device is generating data for communication over the wireless network;

determining whether the rate indication indicates that the data-generation rate is at or above a defined threshold:

responsive to the data-generation rate determination, switching active communication from the LPR to the HPR when the indicated rate is at or above the defined threshold;

obtaining a pending-request indication from a wireless access point (AP) on the wireless network;

determining whether the pending-request indication indicates that the wireless AP has one or more requests from other wireless devices on the wireless network for access to the LPR channel employed by the LPR;

responsive to the pending-request indication determination, switching active communication from the LPR to the HPR when the pending-request indication indicates that the wireless AP has one or more requests from the other wireless devices on the wireless network for access to the LPR channel employed by the LPR.

13. An energy-constrained computing device comprising:
   a low-power radio (LPR) configured to wirelessly communicate data at a low-data rate over a wireless network;
   a high-power radio (HPR) configured to wirelessly communicate data at a high-data rate over the wireless network, wherein power consumption during communication via the HPR is significantly more than power consumption during communication via the LPR;
   a medium as recited in claim 12.

14. A system facilitating efficient power-consumption for data communications over a wireless network, the system comprising:
   a low-power radio (LPR) configured to wirelessly communicate data at a low-data rate over the wireless network;
   a high-power radio (HPR) configured to wirelessly communicate data at a high-data rate over the wireless network, wherein power consumption during communication via the HPR is significantly more than the power consumption during communication via the LPR;
   a multiplexer configured to selectively activate either the LPR or HPR to enable data communications via either the LPR or HPR over the wireless network;
   a network interface configured to direct the multiplexer to activate the LPR when a data-generation rate is at or below a defined threshold and the network interface is further configured to direct the multiplexer to activate the LPR when a user demands that the LPR be activated.

15. A system as recited in claim 14, wherein the network interface is further configured to direct the multiplexer to selectively activate either the LPR or HPR, wherein the network interface directs the multiplexer to selectively activate the LPR and deactivate the HPR when a permissive indication is received from a wireless access point (AP) on the wireless network and that permissive indication indicates that the wireless AP permits an energy-constrained computing device on the wireless network to utilize a LPR channel of the LPR.

16. A system as recited in claim 14, wherein the network interface is further configured to direct the multiplexer to selectively activate either the LPR or HPR, wherein the network interface directs the multiplexer to selectively activate the LPR and deactivate the HPR when a channel-congestion indication is received that indicates that a LPR channel employed by the LPR is uncongested.

17. A system as recited in claim 14 further comprising the network interface configured to direct the multiplexer to selectively activate either the LPR or HPR, wherein the network interface directs the multiplexer to selectively activate the HPR and deactivate the LPR when a pending-request indication is received that indicates that a wireless access point (AP) has one or more requests from other wireless devices on the wireless network for access to a LPR channel employed by the LPR.

18. An energy-constrained computing device comprising a system as recited in claim 14.

19. A computer-readable medium having a program module with computer-executable instructions that, when executed by a wireless access point (AP) employing at least two radio channels—a low-power radio (LPR) channel and a high-power radio (HPR) channel—for wireless data communications over a wireless network, performs a method comprising:
   receiving a request from a wireless computing device—which is actively communicating via a HPR channel—for permission to use a LPR channel;
   responding to the request by sending—via the wireless network—a permission-indication that indicates that the wireless computing device has permission to switch active communication from the HPR channel to the LPR channel.

* * * * *

UNITED STATES PATENT AND TRADEMARK OFFICE
CERTIFICATE OF CORRECTION

| | | |
|---|---|---|
| PATENT NO. | : 7,099,689 B2 | Page 1 of 1 |
| APPLICATION NO. | : 10/610293 | |
| DATED | : August 29, 2006 | |
| INVENTOR(S) | : Bahl et al. | |

It is certified that error appears in the above-identified patent and that said Letters Patent is hereby corrected as shown below:

On the Title page, Item (56), under "U.S. Patent Documents", in column 1, line 1, after "6,653,816" delete "B1" and insert -- B2 --, therefor.

On the Title page, Item (56), under "U.S. Patent Documents", in column 2, line 2, after "6,931,555" delete "B1" and insert -- B2 --, therefor.

On the Title page, Item (56), under "U.S. Patent Documents", in column 2, line 3, after "6,975,667" delete "B1" and insert -- B2 --, therefor.

In column 3, line 39, delete "802.1 g)" and insert -- 802.11g). --, therefor.

In column 7, line 22, before "and outgoing" delete "(Lo,".

In column 14, line 35, in Claim 4, delete "performs" and insert -- perform --, therefor.

In column 14, line 63, in Claim 5, after "than" insert -- the --.

In column 15, line 4, in Claim 6, delete "performs" and insert -- perform --, therefor.

In column 15, line 43, in Claim 8, after "comprising" insert -- : --.

In column 15, line 49, in Claim 8, after "channel-congestion" insert -- indication --.

In column 15, line 58, in Claim 8, after "user-demand" insert -- indication --.

In column 16, line 10, in Claim 10, delete "performs" and insert -- perform --, therefor.

In column 16, line 21, in Claim 10, before "congested," delete "not".

In column 16, line 54, in Claim 12, delete "threshold:" and insert -- threshold; --, therefor.

In column 17, line 11, in Claim 13, after "than" insert -- the --.

In column 18, line 29, in Claim 19, delete "performs" and insert -- perform --, therefor.

Signed and Sealed this

Sixth Day of April, 2010

David J. Kappos
*Director of the United States Patent and Trademark Office*